United States Patent Office 2,944,939
Patented July 12, 1960

2,944,939

WATER-INSOLUBLE MOLYBDENUM SALTS OF NEOMYCIN AND PROCESS OF USING SAME IN THE PURIFICATION OF NEOMYCIN

George Krsek, Plainfield, N.J., and Richard R. Metcalf, Bloomsburg, and Seemon H. Pines, Lewisburg, Pa., assignors to Merck & Co., Inc., Rahway, N.J., a corporation of New Jersey No Drawing. Filed Feb. 6, 1957, Ser. No. 638,426

5 Claims. (Cl. 167—65)

Our invention relates to novel, water-insoluble salts of neomycin and to the use thereof in processes for the purification of neomycin. The water-insoluble neomycin salts are suitable for use as intermediates in the production of neomycin antibiotic compositions. Utility in human therapy has not been established.

Neomycin, an antibiotic material, was first reported by Waksman and Lechevalier in Science, 109, 305 (1949). These authors, and others, recognized that neomycin as obtained by fermentation processes is not an individual substance but is actually a complex of different forms, e.g., neomycin A, neomycin B and neomycin C.

Consequently, the term "neomycin complex" was suggested by Waksman et al. to refer to the antibiotic material obtained by them. This term is therefore used herein to refer to neomycin as obtained by fermentation processes prior to its isolation into any of its component forms. In a broader sense, the term is used herein to define any neomycin, whether acid, neutral or basic, which contains a mixture of neomycin A, neomycin B and neomycin C.

While it was thought at one time that neomycin B was inferior to neomycin A for therapeutic value, later work in human therapy has shown the reverse to be true. Indeed, it is now felt that neomycin A has little or no value for use as a therapeutic for human beings. While neomycin C is useful, its effectiveness is only about one-half that of neomycin B.

The therapeutic value of neomycin B in human therapy, coupled with the formation by known processes of neomycin complex, containing types A, B and C, renders it desirable to separate the preferred neomycin B from the other forms of neomycin.

It is not surprising that previous efforts to accomplish this purpose were not successful, as the various forms of neomycin are closely related chemically. Furthermore, the problem of the purification of neomycin complex is particularly difficult, because of the need to eliminate not only one but two forms of neomycin, leaving substantially only the desired B form.

We have, nevertheless, succeeded in accomplishing the desired separation of neomycin complex so as to yield neomycin predominantly of type B. In accordance with this invention, we attain the foregoing result by treating an aqueous solution of neomycin complex with a compound containing an anion comprising molybdenum, thereby forming novel, substantially water-insoluble salts of neomycin, and then recovering from said salts neomycin predominantly of type B, with the substantial absence of type A and with a minor proportion of type C.

In carrying out our novel purification process we employ an aqueous solution of neomycin complex as the starting material. The neomycin complex may be in any of the known forms. For example, it may be employed in the form of a thermostable, basic substance as produced by the Waksman et al. fermentation process described in Science, supra, with *Streptomyces fradiae*.

Or, the filtered neomycin culture medium obtained by said fermentation process may be acidified, for example, with a mineral acid such as sulfuric acid. Also, if desired, water-soluble salts of neomycin complex, such as neomycin sulfate, may be used.

The precipitants employed in accordance with our present invention are compounds including an anion comprising molybdenum. Examples of such compounds include ammonium molybdate, sodium molybdate, molybdic acid, phosphomolybdic acid, and arsenomolybdic acid.

The highly specific nature of our finding that water-insoluble salts of neomycin B can be made is shown by the fact that such salts cannot be formed when agents such as potassium chlorate, potassium bromate, potassium perchlorate, potassium ferricyanide, potassium permanganate, sodium cobaltinitrite, sodium nitroferricyanide, potassium iodate, sodium thiocyanate, ammonium sulfamate, ammonium persulfate, sodium thiosulfate, boric acid, sodium chromate, cobalt chloride, sodium arsenate and sodium borate are used.

In carrying out our process we bring together the precipitant and the aqueous solution of neomycin complex, and then adjust the pH as hereinafter stated. The precipitant advantageously is in aqueous solution also. Sufficient precipitant is used so as to precipitate substantially completely all of the neomycin B. While chemically-equivalent amounts may be employed, we prefer to use an excess of the precipitant. For example, in employing molybdic acid as the precipitant we prefer to use a weight thereof equal to two times the predetermined amount of neomycin base present for optimum yields.

The pH of the contents resulting from the mixing of the precipitant and neomycin complex is lowered to about 1.5 to about 6, advantageously to about 4 to about 5.

To insure that complete precipitation of neomycin has been attained, the so-called phosphomolybdic acid test is used. This simply involves adding an aqueous solution of this acid to a sample of the filtrate. Incomplete precipitation of neomycin is indicated by the formation of a precipitate during the test.

The resulting water-insoluble salts of neomycin B are novel products. In employing these aforementioned novel, water-insoluble salts in accordance with the process of this invention for preparing neomycin B, said salts are converted to water-soluble salts by a suitable adsorption-elution procedure.

In conducting the adsorption-elution procedure, the aforesaid water-insoluble salts are first dissolved in an aqueous alkaline material. Suitable alkaline materials include aqueous ammonia. It has been found that the pH of the resulting solution is from about 8.5 to about 10.0. The alkaline solution is then treated with a mineral acid, such as sulfuric acid, until a pH from about 7.5 to about 8.4 is attained and the resulting solution is then passed over a cation exchange resin at such a rate that substantially all of the neomycin is adsorbed thereon.

Suitable cation exchange resins include, for example, sulfonic acid and carboxylic acid resins such as those marketed in the U.S.A. under the designations Duolite C-25 (made by Chemical Process, Redwood City, Calif.), Amberlite IRC-50 (made by Rohm & Haas, Philadelphia, Pa.), and Dowex 50 (made by Dow Chemical Company, Midland, Mich.). These resins are used on the Na+ or (NH$_4$)+ cycle generally.

After washing the adsorbed neomycin with dionized water, the neomycin is eluted with an alkaline material such as aqueous ammonia, at a rate sufficient to remove substantially all of the neomycin.

The resulting eluate is rendered free of alkaline material, for example, by evaporation where ammonia is employed as the alkaline material. The concentrate freed of alkaline material is diluted with water and passed over an anion exchange resin at such a rate that anion removal is substantially complete.

Suitable anion exchange resins include the quaternary ammonium resins, on the OH— cycle, among which, for example, are noted the following: Amberlite IRA 401 and 411 (made by Rohm & Haas, Philadelphia, Pa.) and Duolite A-101 (made by Chemical Process, Redwood City, Calif).

The resulting effluent is concentrated under vacuum, and a mineral acid, such as sulfuric acid, is added until the pH of the solution reaches 6.65±0.05. If desired, a pH outside this range can be employed but the specific rotation, $SO_4$ content and potency will be affected thereby.

To a solvent such as methanol is then added the foregoing acid solution to cause precipitation of the neutral neomycin salt, which is then dried.

We have found that the neutral water-soluble salts of neomycin obtained in accordance with our present invention possess high potency and meet all United States Pharmacopeia requirements. We have further found that our process permits the obtaining of high potency water-soluble neomycin salts from low potency water-soluble neomycin salts.

In order to illustrate this invention more fully, but without thereby limiting it, the following examples are given.

Example I

Filtered broth, obtained in accordance with the procedure given in Science, 109, 305 (1949), assaying 0.37 mg./ml. at 100 hours and 0.67 mg./ml. final, was adjusted to a pH of 7.8–8.0 and passed over 500 gallons of Duolite C-25 ($Na^+$), at the rate of 30 gallons per minute. About 1750–1800 gallons of 1N ammonia was then fed to the cation exchange resin at the rate of 16 gallons per minute. After a forerun of about 250–300 gallons, neomycin was shown to be present in the eluate by the aforementioned phoshomolybdic acid test. About 1500 gallons of neomycin-containing eluate was obtained following the forerun and was concentrated to about 400–500 gallons by evaporation under a vacuum of 30 mm. Hg pressure at 40°–45° C.

An ammonium molybdate solution was prepared by mixing 90 kilograms of reagent molybdic acid (85%) in 200 gallons of water and sufficient aqueous ammonia (20% concentration) to bring about solution. The resulting solution was added to the concentrated eluate and enough aqueous sulfuric acid (25% concentration) was added to give a pH of 4.0–5.

The resulting precipitate was filtered, washed with water until the filtrate was colorless. The precipitate was mixed with 800 gallons of water and enough aqueous ammonia (20% concentration) was added to the resulting slurry to bring the pH to 9.0–9.5, a solution resulting thereby. Aqueous sulfuric acid (25% concentration) was then carefully added until the solution had a pH of 7.9 to 8.0.

The solution of pH 7.9 to 8.0 was passed over 500 gallons of Duolite C-25 cation exchange resin at the rate of 16 gallons per minute and then eluted with 1N ammonia and the eluate concentrated, as described above in this example.

The resulting concentrate was diluted to 700 gallons with deionized water and passed over 700 gallons of Amberlite IRC 411 anion exchange resin at 10 gallons per minute. Following a forerun of 300–400 gallons, 1800 gallons of neomycin-containing eluate was obtained and this was concentrated to a volume of 50 gallons by evaporation at a temperature of 40°–45° C. under a vacuum of 30 mm. of mercury.

Enough aqueous sulfuric acid (50% concentration) was added to the foregoing concentrated eluate, maintained at a temperature below 20° C. until the pH of the solution became 6.65. The resulting solution was then added to 5 times its volume of methanol. The precipitated neomycin sulfate was filtered, washed with methanol and dried under a vacuum of 15 mm. of mercury at 50° C.

There was obtained about 90 pounds of a product having a potency of at least 620 gamma/mg. and meeting United States Pharmacopeia specifications.

Example II

To a solution of 25 grams of crude neomycin sulfate (potency of 350 gamma/mg.) in 500 ml. of water was added a solution of 25 grams of molybdic acid in 250 ml. of aqueous ammonia (10% concentration). Aqueous sulfuric acid (25% concentration) was added dropwise, under agitation, until a pH of 5.3–5.5 was reached. The precipitate was filtered and washed with 200 ml. of water.

To the resulting damp precipitate was added 850 ml. of water and sufficient aqueous ammonia (40 ml. of concentrated ammonium hydroxide) to cause solution. The pH of the solution was adjusted to 7.9–8.0 with aqueous sulfuric acid and the solution was adsorbed on 300 ml. of Duolite C-25 cation exchange resin at the rate of 10 ml./min. About 600 ml. of water was then passed over the resin to clear the column.

The neomycin base was eluted with 900 ml. of 1N aqueous ammonia, followed by 600 ml. of distilled water. The eluate was stripped of ammonia by concentration under a vacuum of 20 mm. of mercury pressure at 40°–45° C.

The ammonia-free concentrate was then diluted with distilled water to 1 liter and passed over 900 ml. of Amberlite IRC 411 anion exchange resin, at the rate of 10–15 ml./min. The effluent and follow wash (2700 ml. of distilled water) was concentrated under a vacuum of 20 mm. Hg pressure to about 75 ml.

To the resulting concentrate was added aqueous sulfuric acid (25% concentration) until the solution had a pH of 6.5–6.6, the temperature being maintained below 20° C. The solution was then added to 5 times its volume of methanol and the precipitated neomycin sulfate was filtered, washed with methanol, and dried under a vacuum of 10 mm. of mercury at 50° C.

There was obtained 18 grams of a product having a potency of at least 620 gamma/mg. and meeting United States Pharmacopeia specifications.

An equivalent amount of phosphomolybdic acid was substituted for the ammonium molybdate used in Examples I and II. The water-insoluble neomycin phosphomolybdate had a specific rotation of −36.8° (9% L.O.D.). The yields and results obtained were substantially the same as those obtained in the examples, which also was the case when the other aforementioned operable precipitants were employed.

Various changes and modifications may be made in carrying out the present invention without departing from the spirit and scope thereof. Insofar as these changes and modifications are within the purview of the annexed claims, they are to be considered as part of this invention.

What is claimed is:

1. In the process of purifying neomycin, the improvement which comprises reacting an aqueous solution of neomycin complex at a pH within the range of about 1.5 to about 6.0 with a compound selected from the group consisting of ammonium molybdate, sodium molybdate, molybdic acid, phosphomolybdic acid, and arsenomolybdic acid, whereby to form a substantially water-insoluble salt of neomycin, and recovering from said salt neomycin predominantly of type B with the substantial absence of type A.

2. The process of claim 1, wherein the recovered neomycin is in the form of a water-soluble salt of neomycin and a mineral acid.

3. The process of claim 1, wherein the recovered neomycin is in the form of neomycin sulfate.

4. The process of purifying neomycin, which comprises adding aqueous ammonium molybdate and sufficient sulfuric acid to an aqueous solution of neomycin complex to give a pH of about 4. to about 5., whereby water-insoluble neomycin molybdate is formed, dissolving the neomycin molybdate in aqueous ammonia and adjusting the pH to about 7.5 to about 8.4 adsorbing the neomycin on a cation exchange resin, eluting the neomycin with aqueous ammonia, contacting the eluted neomycin with an anion exchange resin, neutralizing the resulting liquid with sulfuric acid, and recovering the neomycin sulfate therefrom.

5. The process of purifying neomycin sulfate of low potency, which comprises adding aqueous ammonium molybdate and sufficient sulfuric acid to an aqueous solution of neomycin sulfate to give a pH of about 4. to about 5., whereby water-insoluble neomycin molybdate is formed, dissolving the neomycin molybdate in aqueous ammonia and adjusting the pH to about 7.5 to about 8.4, adsorbing the neomycin on a cation exchange resin, eluting the neomycin with aqueous ammonia, contacting the eluted neomycin with an anion exchange resin, neutralizing the resulting liquid with sulfuric acid, and recovering neomycin sulfate of high potency therefrom.

References Cited in the file of this patent

UNITED STATES PATENTS

| | | |
|---|---|---|
| 2,181,884 | Giuliano | Dec. 5, 1939 |
| 2,501,014 | Wintersteiner | Mar. 21, 1950 |
| 2,667,441 | Nager | Jan. 26, 1954 |

OTHER REFERENCES

Waksman: "Neomycin," 1953, pp. 63, 74–87 (p. 81 esp. pert.).